United States Patent
Song et al.

(10) Patent No.: US 8,736,111 B2
(45) Date of Patent: May 27, 2014

(54) APPARATUS AND METHOD FOR THE ANTI-ISLANDING OF POWER CONDITIONING SYSTEM

(75) Inventors: Doo Young Song, Gyunggi-do (KR); Tae Hoon Kim, Gyunggi-do (KR); Tae Won Lee, Gyunggi-do (KR); Don Sik Kim, Gyunggi-do (KR); Jin Wook Kim, Seoul (KR); Jae Hyung Kim, Gyunggi-do (KR); Jun Gu Kim, Gyunggi-do (KR); Yong Hyok Ji, Gyunggi-do (KR); Chung Yuen Won, Gyunggi-do (KR); Byoung Kuk Lee, Gyunggi-do (KR)

(73) Assignees: Samsung Electro-Mechanics Co., Ltd., Gyunggi-Do (KR); Sungkyunkwan University Foundation for Corporate Collaboration, Gyunggi-Do (KR)

( * ) Notice: Subject to any disclaimer, the term of this patent is extended or adjusted under 35 U.S.C. 154(b) by 735 days.

(21) Appl. No.: 12/950,534

(22) Filed: Nov. 19, 2010

(65) Prior Publication Data

US 2011/0309684 A1 Dec. 22, 2011

(30) Foreign Application Priority Data

Jun. 22, 2010 (KR) .................. 10-2010-0059212

(51) Int. Cl.
*H02J 1/00* (2006.01)
*H02J 3/00* (2006.01)
*H02J 3/08* (2006.01)

(52) U.S. Cl.
CPC .... *H02J 3/00* (2013.01); *H02J 3/08* (2013.01)
USPC .............. 307/87; 307/125; 307/129; 307/130

(58) Field of Classification Search
CPC ................ H02J 3/00; H02J 3/008; H02J 3/08
USPC .......................................................... 307/87
See application file for complete search history.

(56) References Cited

U.S. PATENT DOCUMENTS

| | | | | |
|---|---|---|---|---|
| 7,843,082 | B2 * | 11/2010 | Chou et al. ................. | 307/64 |
| 2005/0110454 | A1 * | 5/2005 | Tsai et al. .................. | 320/101 |
| 2009/0141522 | A1 * | 6/2009 | Adest et al. ............... | 363/55 |
| 2010/0309692 | A1 * | 12/2010 | Chisenga et al. .......... | 363/37 |
| 2012/0087159 | A1 * | 4/2012 | Chapman et al. .......... | 363/41 |

FOREIGN PATENT DOCUMENTS

| | | | |
|---|---|---|---|
| JP | 08070534 A | 3/1996 | |
| JP | 08130830 A | 5/1996 | |
| JP | 09322409 A | 12/1997 | |
| KR | 1020090074318 A | 7/2009 | |

OTHER PUBLICATIONS

Korean Office Action 10-2010-0059212 issued on Jun. 28, 2011.

* cited by examiner

*Primary Examiner* — Rexford Barnie
*Assistant Examiner* — Toan Vu
(74) *Attorney, Agent, or Firm* — Lowe Hauptman & Ham, LLP

(57) ABSTRACT

There is provided an apparatus for the anti-islanding of a power conditioning system. The apparatus for the anti-islanding of a power conditioning system according to the present invention is applied to a power conditioning system including a DC/DC converter and a DC/AC inverter in order to transfer power from a solar cell array to a grid. The apparatus for the anti-islanding of a power conditioning system may include an injection signal generator generating an injection signal, an adder generating a final fundamental wave command value, a main controller performing the power control according to the final fundamental wave command value and stopping the operation of the power conditioning system when the level of the detected injection signal has reached the predetermined reference level or more, and an injection signal detector detecting the injection signal included in voltage and providing them to the main controller.

9 Claims, 12 Drawing Sheets

APPARATUS AND METHOD FOR THE ANTI-ISLANDING OF POWER CONDITIONING SYSTEM

CROSS-REFERENCE TO RELATED APPLICATIONS

This application claims the priority of Korean Patent Application No. 10-2010-0059212 filed on Jun. 22, 2010, in the Korean Intellectual Property Office, the disclosure of which is incorporated herein by reference.

BACKGROUND OF THE INVENTION

1. Field of the Invention

The present invention relates to an apparatus and a method for the anti-islanding of a power conditioning system (PCS) capable of controlling power from a solar cell array, and more particularly, to an apparatus and a method for the anti-islanding of a power conditioning system (PCS) capable of easily detecting an islanding state by using an injection signal maintained at a level smaller than that of a reference level in a grid interconnected state and increased to a level larger than a reference level in an islanding state.

2. Description of the Related Art

Generally, an islanding detection algorithm for detecting an islanding state of a distributed power supply is classified as either an active method or a passive method.

First, the active method is a method of determining islanding by controlling the output from the distributed power supply and monitoring the response. This method can readily detect the islanding of the distributed power supply but directly controls the output from the distributed power supply, thereby having an unintended effect on the grid. During islanding, to supply power by interconnecting several distributed power supplies to a power grid, even though the output from the distributed power supplies is controlled, the variations corresponding to the controlled output are not generated due to the effects of other generators, such that a case in which islanding is mistaken for an interconnecting operation may occur.

Next, the passive method is a method capable of detecting islanding using a change in several parameters of the grid during islanding. Unlike the method for detecting the active distributed power supply, the passive methods can detect islanding without having a negative effect on the grid, but it is difficult to detect islanding due to the small change in parameters in islanding when keeping a balance between power from the distributed power supply and power consumed by loads.

Generally, the active methods and the passive methods for detecting islanding in the distributed power supply, leading to accidents, will be described in more detail below.

The active method will first be described.

An example of the active method for detecting islanding in the distributed power supply may include a reactive export error detector (REED), an active frequency drift (AFD), and the like. Since these active methods for detecting islanding can rapidly and readily detect islanding in the distributed power supply, but optionally vary the output from the distributed power supply or change the structure of the grid, they may lead to unintended effects in the grid.

Further, in the case in which several generators are interconnected with the distribution grid, it may be difficult to detect islanding with the active method when grid voltage is lost. The reason is that other distributed power supplies respond to the output variations of the distributed power supply. The islanding having the single distributed power supply and the loads has large grid response characteristics in connection with the output variations of the distributed power supply. However, when there are several generators, there is a disadvantage in that the islanding of the distributed power supply may be determined as the general interconnected operation form since the response characteristics corresponding to the output variations of the distributed power supply are not generated.

Next, the passive method will be described.

When the above-mentioned active method is a method of detecting the islanding by directly controlling the output from the distributed power supply, the passive method monitors the variations in the grid parameters such as voltage, phase, frequency, reactive power, or the like, which are generated when islanding the distributed power supply, to determine whether or not the grid voltage interconnected with the distributed power supply is present.

Unlike the active method, determining the islanding of the distributed power supply using the passive method does not generate negative effects due to the variations in the output of the distributed power supply, but when keeping a balance between the power output of the distributed power supply and the consumed amount of the grid load in the islanding, makes the variations between the parameters smaller. In some cases, there is a problem in that it is difficult to detect islanding.

SUMMARY OF THE INVENTION

An aspect of the present invention provides an apparatus and a method for islanding of a power conditioning system capable of easily detecting an islanding state by using by using an injection signal maintained at a level smaller than a reference level in a grid interconnected state and increased to a level larger than a reference level in an islanding state.

According to an aspect of the present invention, there is provided an apparatus for the anti-islanding of a power conditioning system including a DC/DC converter and a DC/AC inverter in order to transfer power from a solar cell array to a grid, including: an injection signal generator generating an injection signal having a predetermined frequency; an adder generating a final fundamental wave command value by adding the injection signal from the injection signal generator to the predetermined fundamental wave command value; a main controller performing the power control according to the final fundamental wave command value from the adder and stopping the operation of the power conditioning system when the level of the detected injection signal has reached the predetermined reference level or more; and an injection signal detector detecting the injection signal included in voltage at a point of common coupling (PCC) between the power conditioning system and the grid and providing them to the main controller.

The injection signal generator generates a 9-order harmonic of the commercial frequency as the injection signal.

The apparatus for the anti-islanding of a power conditioning system further includes: a grid phase detector detecting a grid phase corresponding to a phase of the voltage at the point of common coupling between the power conditioning system and the grid; and a multiplier multiplying the grid phase from the grid phase detector by the predetermined direct current command value to generate the fundamental wave command value.

According to another aspect of the present invention, there is provided a method for the anti-islanding of a power conditioning system including a DC/DC converter and a DC/AC inverter in order to transfer power from the solar cell array to the grid, including: generating an injection signal having a predetermined frequency; adding the injection signal from the generating to the predetermined fundamental wave command value to generate a final fundamental wave command value; controlling to perform the power control according to the final fundamental wave command value from the adding; detecting the injection signal included in the voltage at the point of common coupling PCC between the power conditioning system and the grid; determining whether the level of the detected injection signal has reached the predetermined reference level or more; and stopping the operation of the power conditioning system when the level of the injection signal has reached the predetermined reference level or more.

The generating generates a 9-order harmonic of the commercial frequency as the injection signal.

The method for the anti-islanding of a power conditioning system further includes: detecting a grid phase corresponding to a phase of the voltage at the point of common coupling between the power conditioning system and the grid; and multiplying the grid phase from the detecting the grid phase by the predetermined direct current command value to generate the fundamental wave command value.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EXEMPLARY EMBODIMENT

Figure 1:
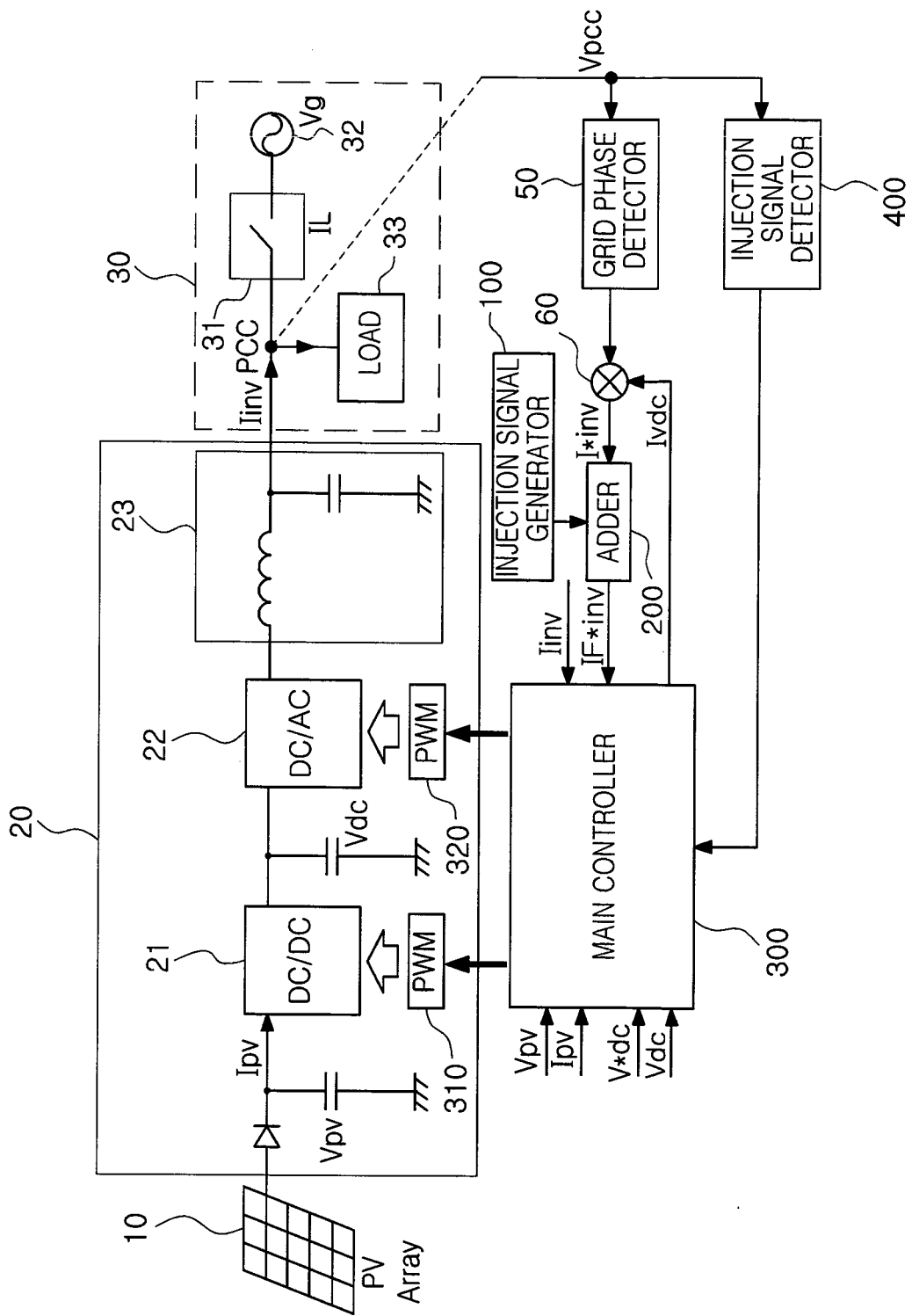
FIG. 1 is a block diagram of an apparatus for the anti-islanding of a power conditioning system according to the present invention.

Exemplary embodiments of the present invention will now be described in detail with reference to the accompanying drawings.

The present invention should not be limited to the embodiments set forth herein and the embodiments may be used to assist in understanding the technical idea of the present invention. Like reference numerals designate like components having substantially the same constitution and function in the drawings of the present invention.

FIG. 1 is a block diagram of an apparatus for the anti-islanding of a power conditioning system according to the present invention.

Referring to FIG. 1, an anti-islanding apparatus according to the present invention is applied to a power conditioning system (PCS) 20 including a DC/DC converter 21 and a DC/AC inverter 22 in order to transfer power from a solar cell array 10 to a grid 32. The apparatus for the anti-islanding of a power conditioning system may include an injection signal generator 100 generating an injection signal ST having a predetermined frequency, an adder 200 generating a final fundamental wave command value IF*inv by adding the injection signal ST from the injection signal generator 100 to the predetermined fundamental wave command value I*inv, a main controller 300 performing the power control according to the final fundamental wave command value IF*inv from the adder 200 and stopping the operation of the power conditioning system 20 when the level of the detected injection signal ST is the predetermined reference level or more, and an injection signal detector 400 detecting the injection signal ST included in a voltage Vpcc at a point of common coupling (PCC) between the power conditioning system 20 and the grid 32 and providing them to the main controller.

Figure 2:
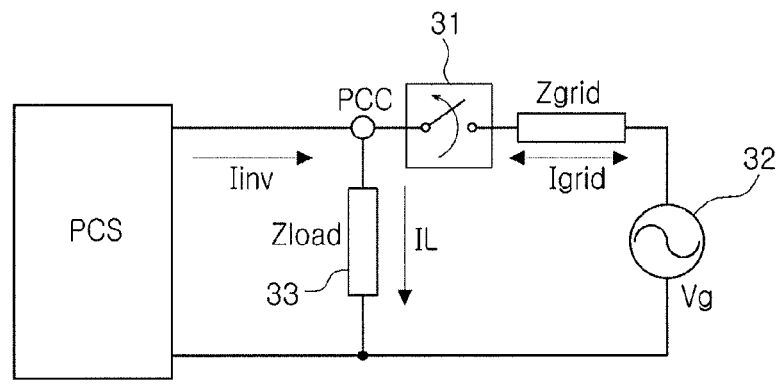
FIG. 2 is an equivalent circuit diagram between grid impedance and load impedance of an output end of the power conditioning system according to the present invention.

FIG. 2 is an equivalent circuit diagram between grid impedance and load impedance of an output end of the power conditioning system according to the present invention. Referring to FIG. 2, a point at which the PCS 20 and the grid 32 intersects with each other is referred to as a point of common coupling (PCC).

In this case, when viewing the PCC from the PCS 20, parallel impedance between the grid impedance Zgrid and the load impedance Zload is shown if the PCS 20 is interconnected with the grid 32. In this configuration, the Zgrid is remarkably smaller than Zload, the parallel impedance value is shown as an extremely small value since it is several m [ohm] to several [ohm].

Referring to FIG. 1, the main controller 300 may generate a direct current command value Ivdc corresponding to a difference voltage between a voltage Vdc at a DC-Link end between the DC/DC converter 21 and the DC/AC inverter and a voltage command value V*dc at the DC-Link end Further, the main controller 300 may control to allow the DC/DC converter 21 to perform maximum power point tracking (MPPT) at the output of the solar cell 10 varying according to insolation and temperature, based on voltage Vpv and current Ipv of the solar cell 10.

In this case, the apparatus for the anti-islanding of the power conditioning system (PCS) according to the present invention may further include a grid phase detector 50 detecting a grid phase corresponding to a phase of the voltage Vpcc at the point of common coupling (PCC) between the power conditioning system (PCS) 20 and the grid 32 and a multiplier 60 multiplying the grid phase from the grid phase detector 50 by the predetermined direct current command value Ivdc to generate the fundamental wave command value I*inv.

Meanwhile, a harmonic such as a 3-order harmonic or a 5-order harmonic or 7-order harmonic of a commercial frequency corresponding to the frequency of the grid may be generated as the injection signal, based on the grid phase information from the grid phase detector 50.

Figure 3:
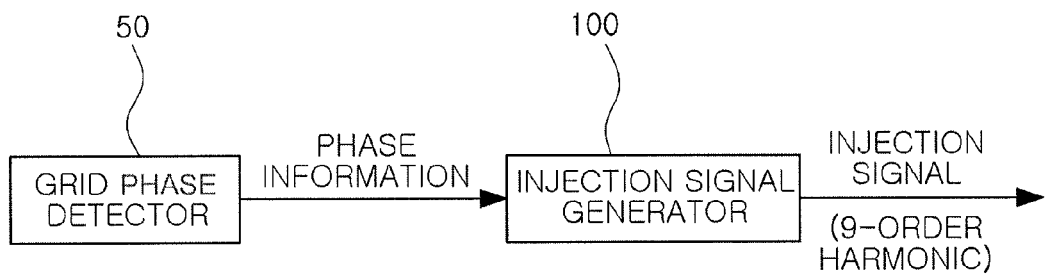
FIG. 3 is a diagram showing an example of an injection signal generator according to the present invention.

FIG. 3 is a diagram showing an example of an injection signal generator according to the present invention.

Referring to FIG. 3, the injection signal generator 100 may generate, for example, a 9-order harmonic of the commercial frequency corresponding to the frequency of the grid, based on the grid phase information from the grid phase detector 50. We can have a choice another hamonic among a plural hamonics, such as 3-order harmonic, 5-order harmonic, 7-order harmonic and so on.

Figure 4:
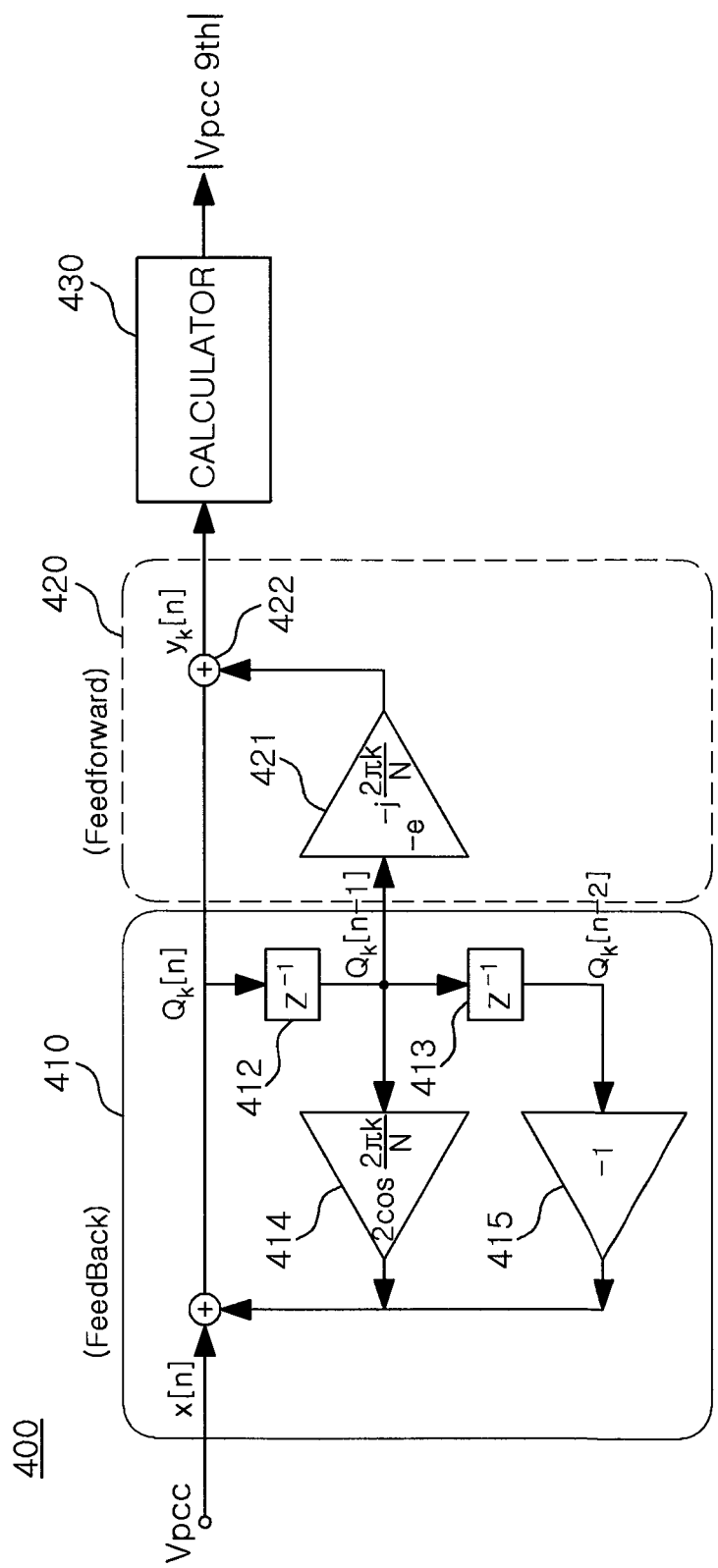
FIG. 4 is a diagram showing an injection signal detector implemented as a Goertzel filter according to the present invention.

FIG. 4 is a diagram showing an injection signal detector 400 implemented as a Goertzel filter according to the present invention.

Referring to FIG. 4, the injection signal detector 400 may be configured to include a transfer function H(z) having a feed back part (FBP) 410 and a feed forward part (FFP) 420.

In more detail, the injection signal detector 400 may include the predetermined feed back part (FBP) 410, the predetermined feed forward part (FFP) 420, and a calculator 430 calculating a 9-order harmonic |Vpcc9th| level of a load current IL.

In this case, the transfer function H(z) may be represented by the following Equation 1. The following Equation 2 represents the relationship between a discrete frequency k and a sampling frequency fs to be extracted and a frequency fint to be extracted. Equations 3, 4, and 5 represent the following Equation 1 as a difference equation.

In the following Equations 1 to 5, x[n] represents a currently input signal sample, v[n] represents an intermediate result from current calculation, v[n−1] represents a result from previous sampling, and v[n−2] represents a place storing a result from a calculation before two samplings. y[n] represents a result value of the Goertzel filter.

As described above, when the following Equations 3, 4, and 5 are represented as a block diagram, they may be shown as in FIG. 4.

Figure 5:
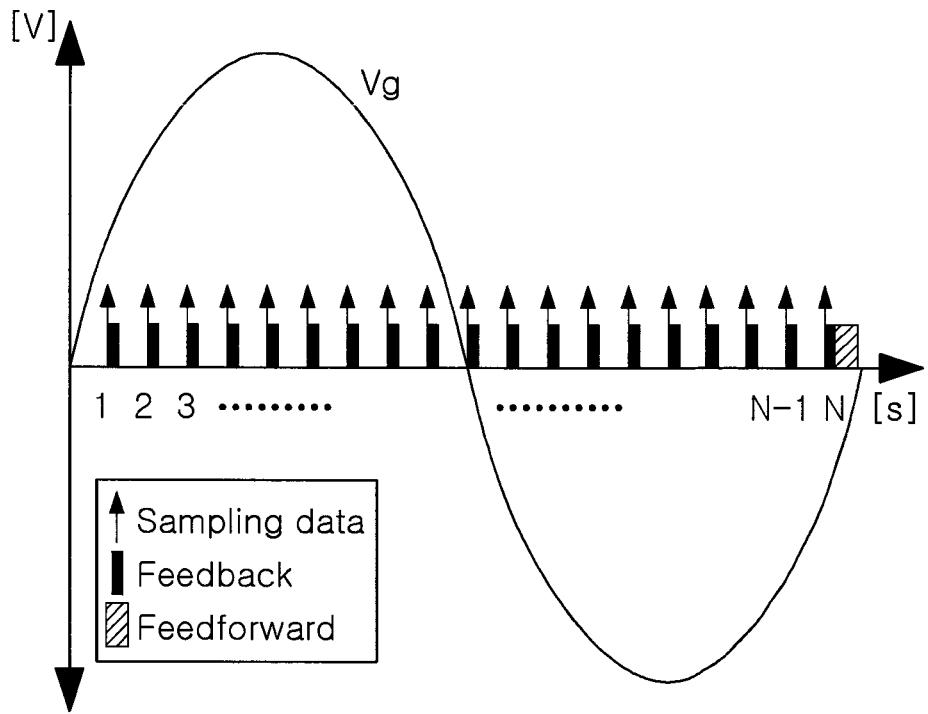
FIG. 5 is a timeline of the Goertzel filter of FIG. 4.

FIG. 5 is a timeline of the Goertzel filter of FIG. 4. In the timing waveform of FIG. 5, when N samplings are performed for one period of a grid voltage Vg, the feed back part is calculated for each sampling, and the feed forward part is calculated after the calculation of N-th feedback number ends, the frequency amplitude to be extracted may be calculated.

In the zero and pole of the Goertzel filter, the zero offsets the poly to leave only one pole, such that only a signal corresponding to a discrete frequency k corresponding to the pole passes through the Coertzel filter.

Figure 6:
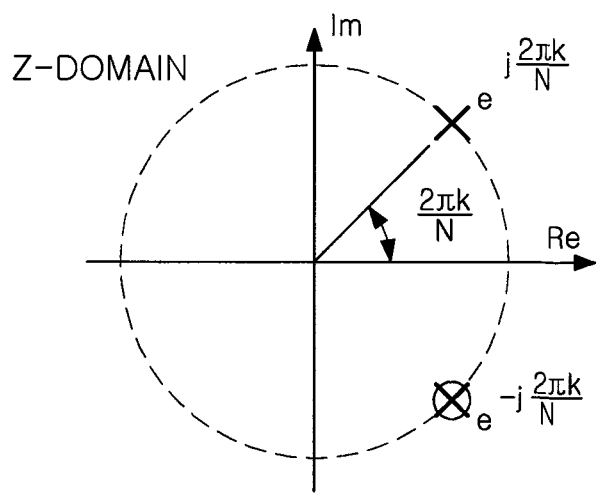
FIG. 6 is a diagram showing a position of a zero and a pole in a Z-domain for the Goertzel filter of FIG. 4.
Figure 7:
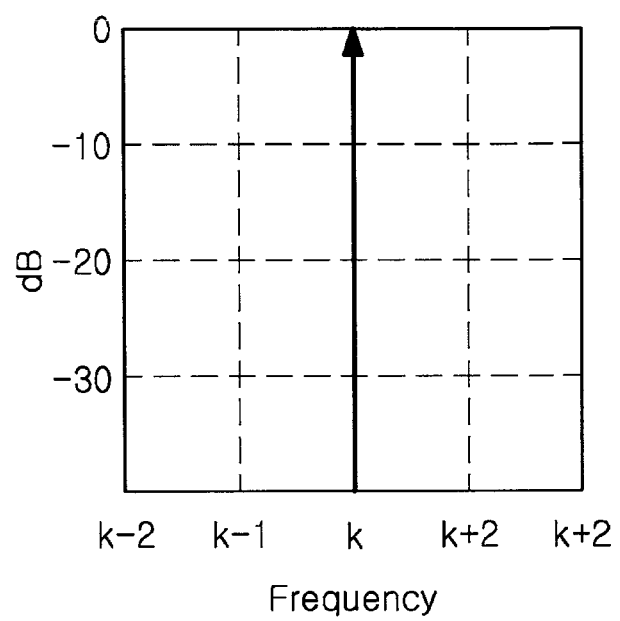
FIG. 7 is a frequency amplitude responding graph for the Goertzel filter of FIG. 4.

FIG. 6 is a diagram showing a position of a zero point and a pole in a Z-domain for the Goertzel filter of FIG. 4 and FIG. 7 is a frequency amplitude responding graph for the Goertzel filter of FIG. 4.

Referring to FIGS. 6 and 7, the frequency amplitude to be extracted by the Goertzel filter may be obtained according to the following Equation 6.

Figure 8:
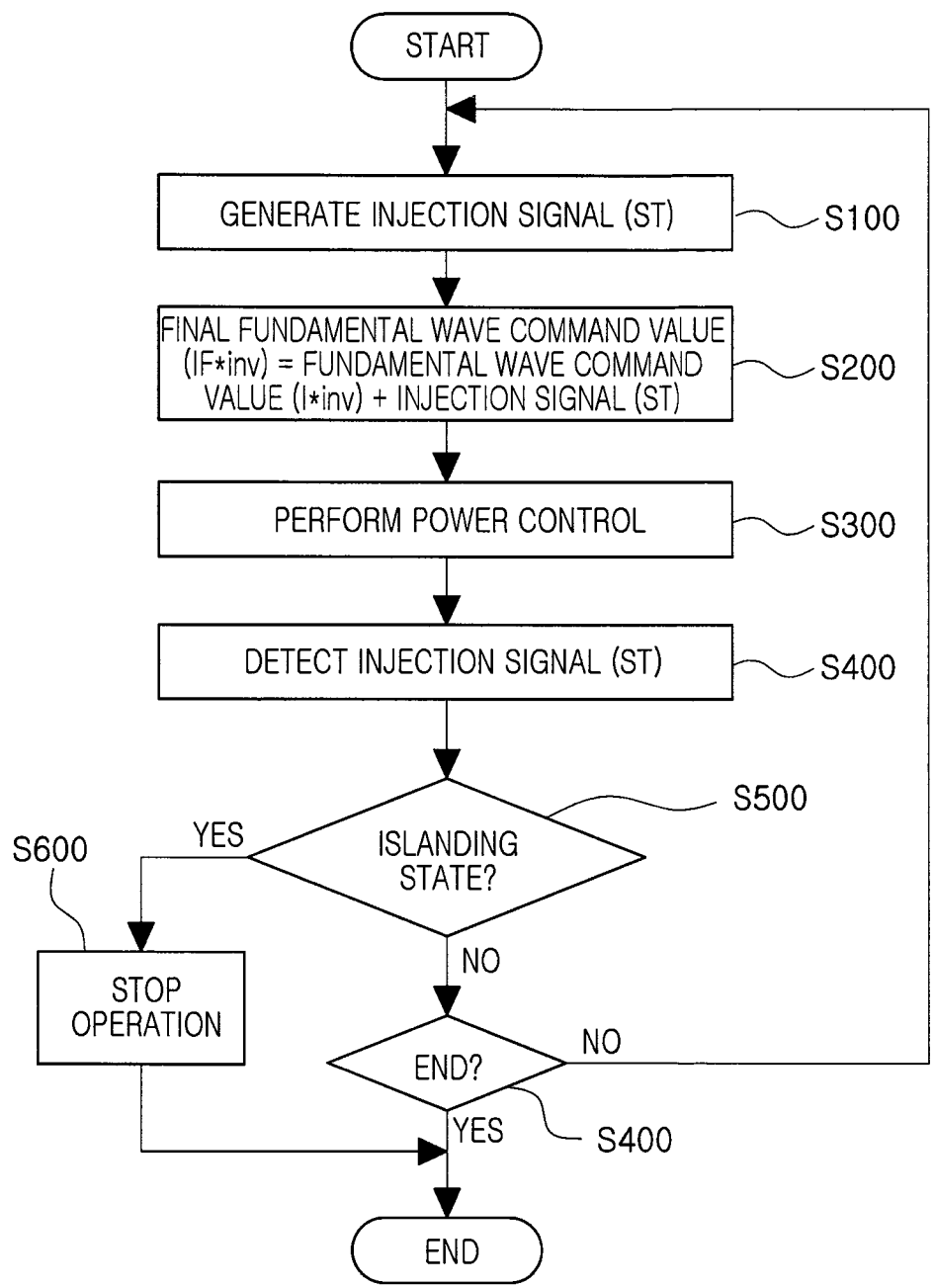
FIG. 8 is a flow chart of a method for the anti-islanding of a power conditioning system according to the present invention.

FIG. 8 is a flow chart of a method for the anti-islanding of a power conditioning system according to the present invention.

Referring to FIG. 8, an anti-islanding method according to the present invention is applied to the power conditioning system (PCS) 20 including the DC/DC converter 21 and the DC/AC inverter 22 in order to transfer power from the solar cell array 10 to the grid 32. The method for the anti-islanding of the power conditioning system may include generating (S100) an injection signal ST having a predetermined frequency, adding (S200) the injection signal ST from the generating (S100) to the predetermined fundamental wave command value I*inv to generate a final fundamental wave command value IF*inv, controlling (S300) to perform the power control according to the final fundamental wave command value IF*inv from the adding (S200), detecting (S400) the injection signal ST included in the voltage Vpcc at the point of common coupling PCC between the power conditioning system 20 and the grid 32, determining (S500) whether the level of the detected injection signal ST is the predetermined reference level or more, and stopping (S600) the operation of the power conditioning system (PCS) 20 when the level of the injection signal ST is the predetermined reference level or more.

Figure 9:
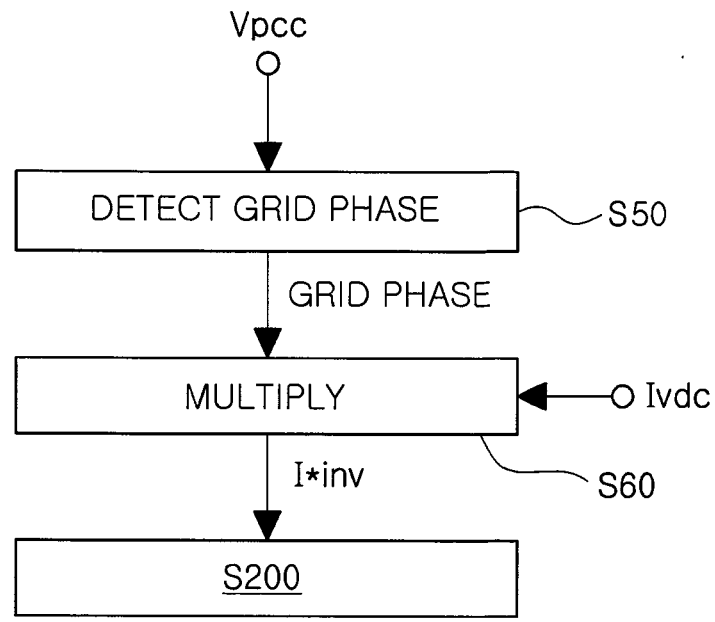
FIG. 9 is a flow chart showing a process of generating a fundamental wave command value according to the present invention.

FIG. 9 is a flow chart showing a process of generating a fundamental wave command value according to the present invention.

Referring to FIG. 9, the method for the anti-islanding of the power conditioning system may further include generating the fundamental wave command value, wherein the generating of the fundamental wave command value may include detecting (S50) the grid phase corresponding to the phase of the voltage Vpcc at the point of common coupling (PCC) between the power conditioning system PCS and the grid 32 and multiplying (S60) the grid phase from the detecting of the grid phase (S50) by the predetermined direct current command value I*vdc to generate the fundamental wave command value I*inv.

Figure 10:
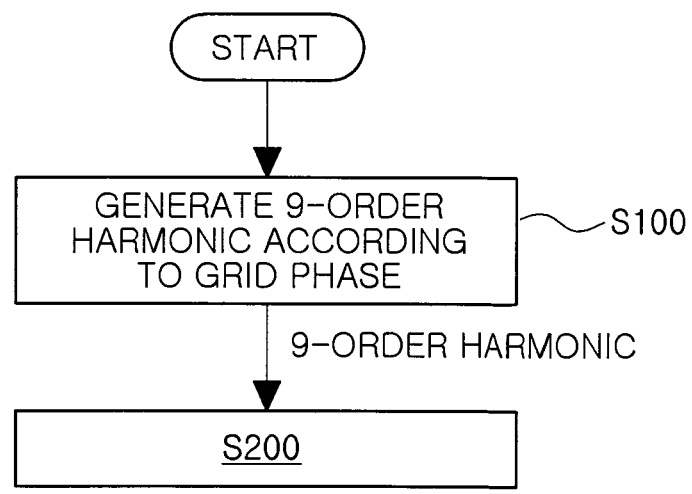
FIG. 10 is a diagram showing an example of an injection signal generating process according to the present invention.

FIG. 10 is a diagram showing an example of an injection signal generating process according to the present invention.

Referring to FIG. 10, the generating (S100) may generate the 9-order harmonic of a commercial frequency as the injection signal ST. We can have a choice another hamonic among a plural hamonics, such as 3-order harmonic, 5-order harmonic, 7-order harmonic and so on.

Figure 11:
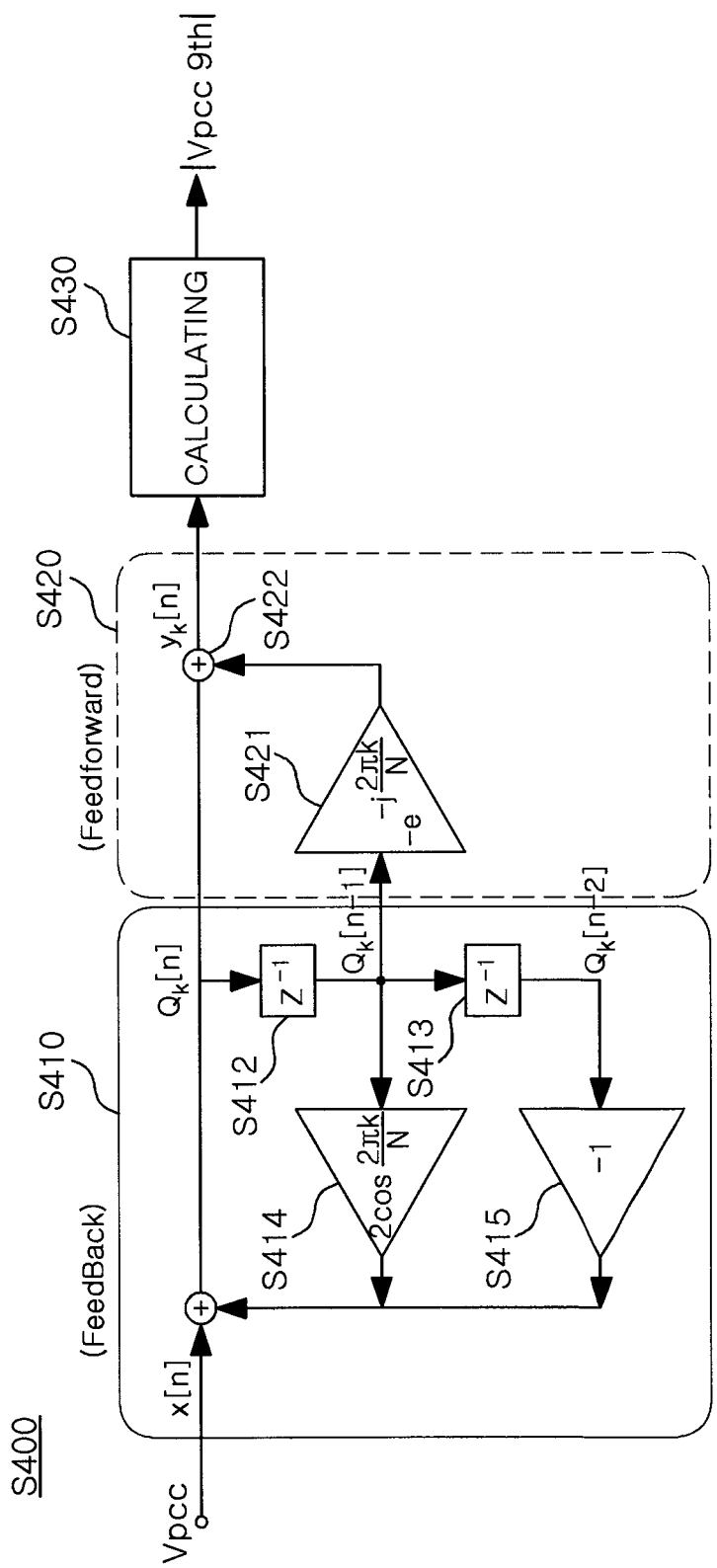
FIG. 11 is a diagram showing an example of a process of generating an injection signal implemented as a Goertzel filter according to the present invention.

FIG. 11 is a diagram showing an example of a process of generating an injection signal implemented as a Goertzel filter according to the present invention. Referring to FIG. 11, the generating of the injection signal (S400) may be configured to include a transfer function H(z) having the feedback part and the feed forward part.

In greater detail, the generating of the injection signal (S400) may include the predetermined feed back part (FBP) step (S410), the predetermined feed forward part (FFP) step (S420), and calculating (S430) the level of the fundamental wave IL(1) of the load current IL.

The transfer function H(z) may be represented by the following Equation 1. The following Equation 2 represents the relationship between a discrete frequency k and a sampling frequency fs to be extracted and a frequency fint to be extracted. Equations 3, 4, and 5 represent the following Equation 1 as a difference equation.

In the following Equations 1 to 5, x[n] represents a currently input signal sample, v[n] represents an intermediate result from current calculation, v[n−1] represents a result from previous sampling, and v[n−2] represent a place storing a result from calculation before two samplings. y[n] represents a result value of the Goertzel filter.

As described above, when the following Equations 3, 4, and 5 are represented as a block diagram, they may be shown as in FIG. 3.

Figure 12:
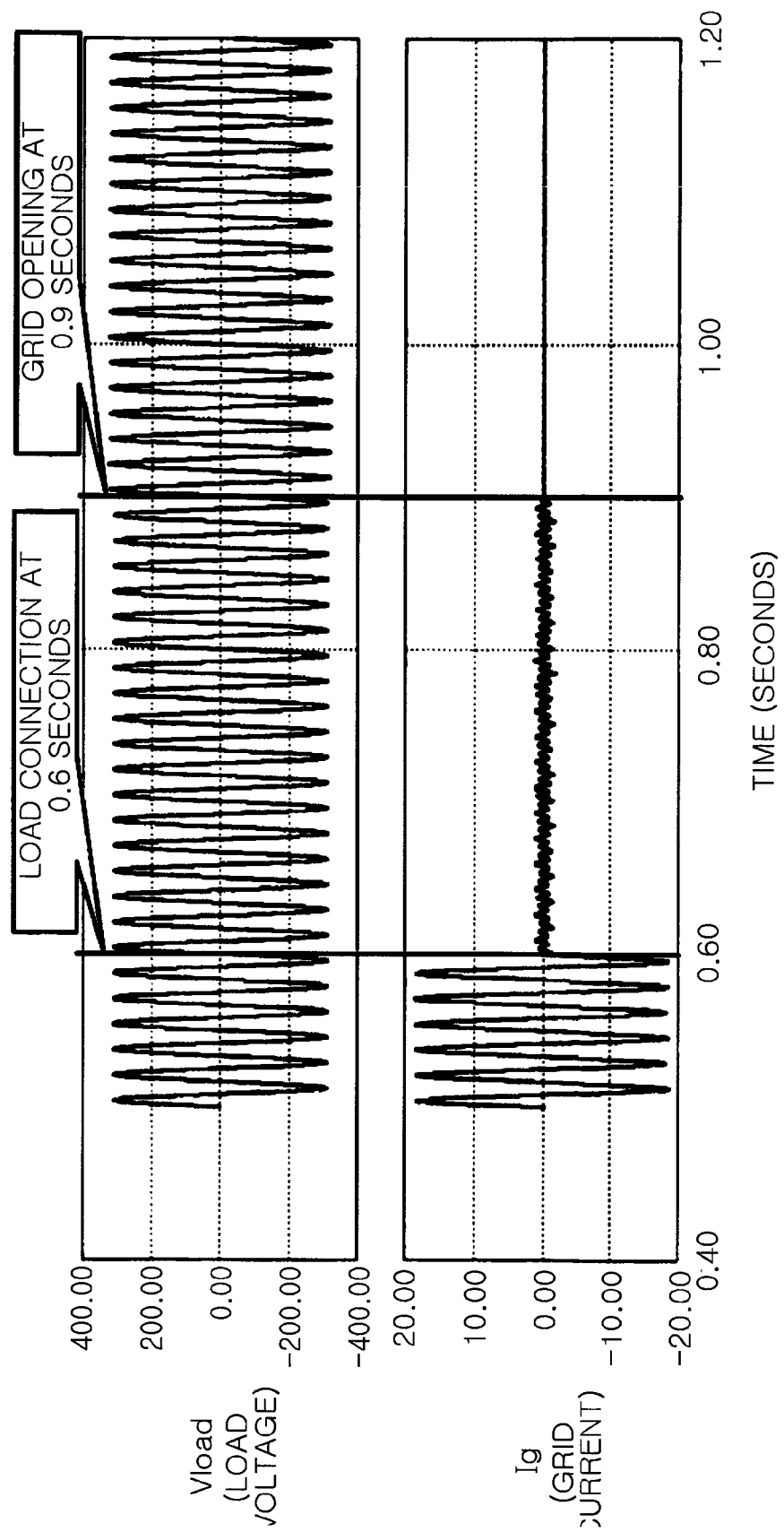
FIG. 12 is a diagram showing a waveform of a load voltage and a grid current before and after a load is connected and a grid is opened, according to the present invention.

FIG. 12 is a diagram showing a waveform of a load voltage and a grid current before and after a load is connected and a grid is opened, according to the present invention. Referring to waveforms of the load voltage and the grid current shown in FIG. 12, waveforms of the output voltage Vload and the grid current Ig of the inverter are shown as a simulation result. Since the distributed power supply from 0 seconds to 0.6 seconds generates power to the grid, the grid current is shown. All the power 3 kW generated from the distributed power supply by being connected to the resistive load of 3 kW at 0.6 seconds is consumed by the resistive load, such that current almost does not flow in the grid. The grid is completely opened from the distributed power supply at 0.9 seconds, such that the grid current becomes 0.

Figure 13:
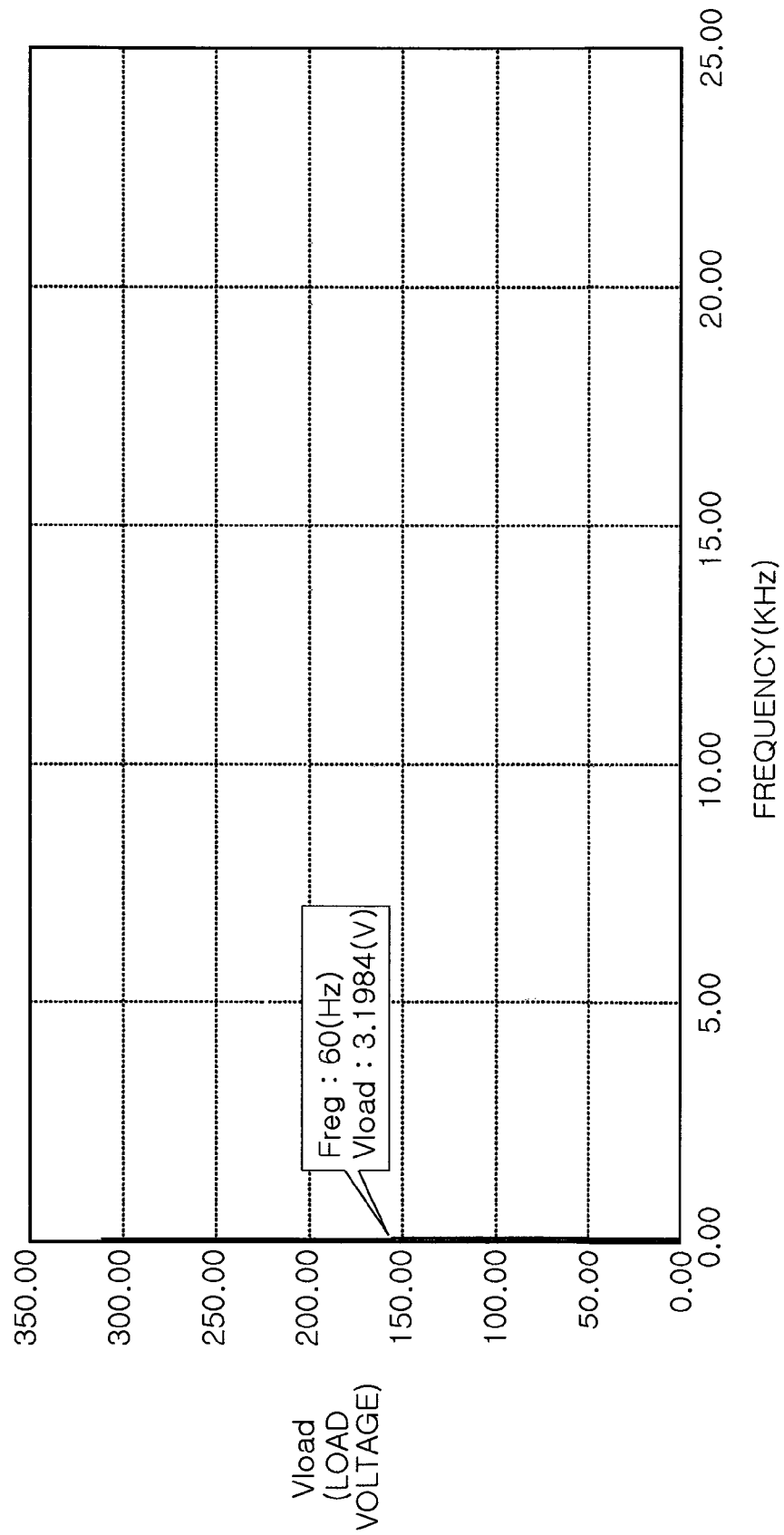
FIG. 13 is a spectrum diagram when the grid of the present invention is interconnected with the distributed power supply.

FIG. 13 is a spectrum diagram when the grid of the present invention is interconnected with the distributed power supply. Referring to the load voltage shown in FIG. 13, FIG. 13 shows a result of analyzing frequency components of the inverter output voltage while the grid is interconnected with the distributed power supply. It can be appreciated that only the fundamental wave 60 Hz is shown as the magnitude in 311 [V].

Figure 14:
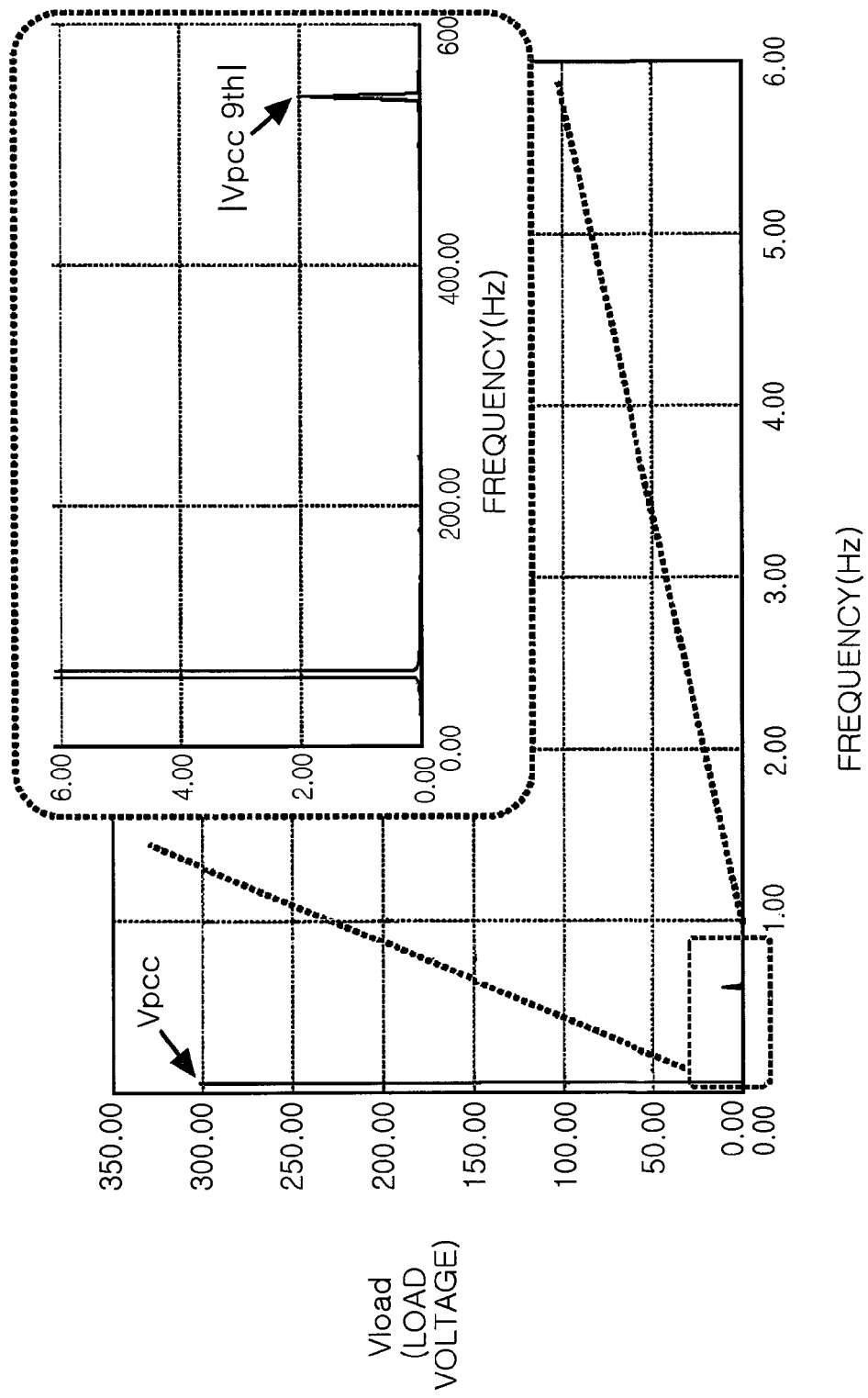
FIG. 14 is a spectrum diagram when the grid of the present invention is opened.

FIG. 14 is a spectrum diagram when the grid of the present invention is opened. The waveform of the load voltage shown in FIG. 14 is a waveform showing the frequency components of the inverter output voltage after the grid is opened. It can be appreciated that the 9-order harmonic voltage component according to the 9-order harmonic current injection is shown after the grid is opened.

Figure 15:
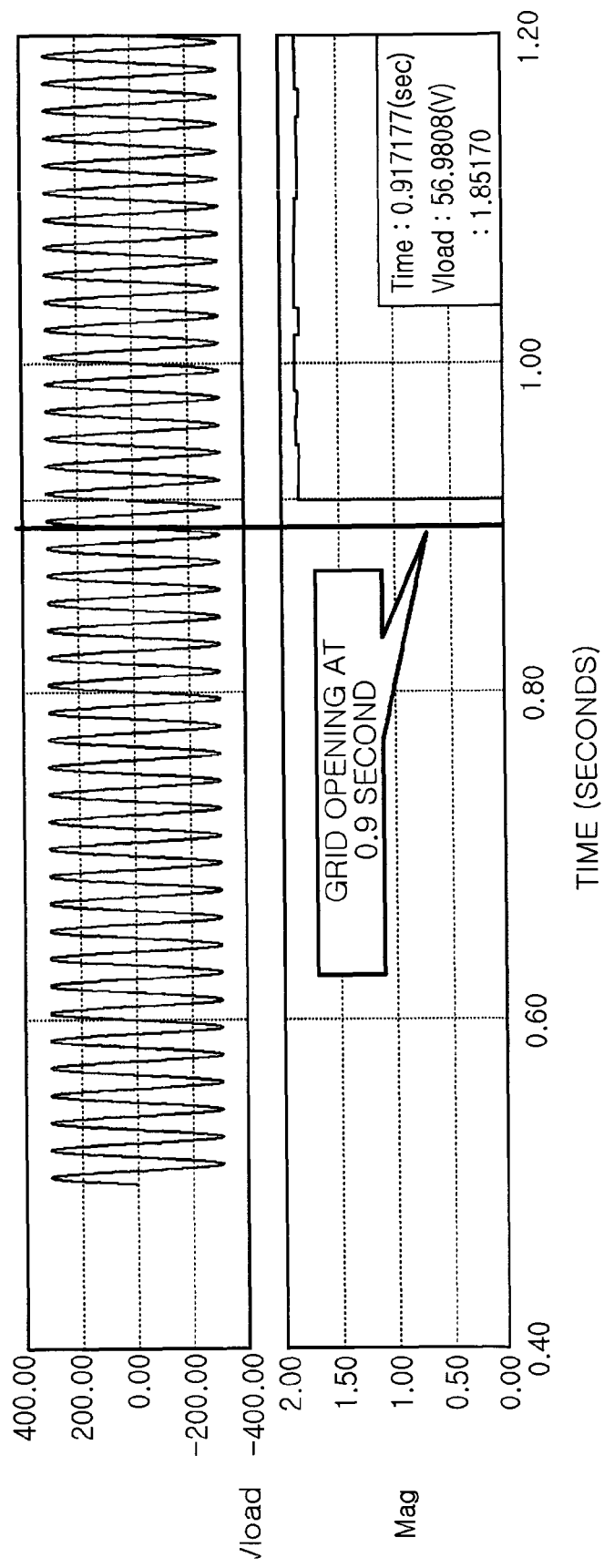
FIG. 15 is a waveform showing a PCS output voltage and a level of an extracted 9-order harmonic component.

FIG. 15 is a waveform showing a PCS output voltage and a level of an extracted 9-order harmonic component. The waveform shown in FIG. 15 shows the inverter output voltage and the level of the 9-order harmonic extracted from the Goertzel algorithm.

That is, when the grid is opened at 0.9 seconds, it can be appreciated that the 9-order harmonic component extracted by the Goertzel algorithm is shown as 1.8[V] after one period of the inverter output voltage fundamental wave. After it is confirmed that the 9-order harmonic component is detected, the anti-islanding function is performed.

Hereinafter, the operations and effects of the present invention will be described in detail with reference to the accompanying drawings.

The apparatus for the anti-islanding of the power conditioning system according to the present invention will be described with reference to FIGS. 1 to 7. In FIG. 1, the power conditioning system 20 to which the anti-islanding apparatus according to the present invention is applied converts the direct voltage Vpv from the solar cell 10 into voltage suitable for grid interconnection.

That is, the DC/DC converter 21 of the power conditioning system 20 boosts direct voltage Vpv from the solar cell 10 to the predetermined voltage level and tracks the maximum power point from the solar cell 10. The DC/AC inverter 22 of the power conditioning system 20 converts direct voltage from the DC/DC converter 21 into alternating voltage to supply the inverter current Iinv to the grid 32.

In this case, the DC/DC converter 21 serves to perform the maximum power point tracking (MPPT) from the output of the solar cell 10 varying according to the insolation and temperature and extract the maximum power to store it in a capacitor at the DC-Link end. The control of the DC-Link end voltage (for example, 380 V) is performed in the DC/AC inverter 30. When the maximum power of the solar cell 10 is extracted from the DC/DC converter 21, the DC-Link end voltage is boosted and the DC/AC inverter 22 injects the energy stored in the DC-Link end into the grid to control the DC-Link end voltage while reducing the DC-Link end voltage.

The DC/AC inverter 22 converts the voltage from the DC/DC converter 21 into alternating voltage synchronized with the grid phase and supplies it to the grid.

The power conditioning system 20 may further include a filter 23, wherein the filter 23 may remove noise, such as a ripple included in the alternating voltage, or the like, from the DC/AC inverter 22.

In this case, the injection signal generator 100 according to the present invention generates the injection signal ST having a predetermined frequency and provides it to the adder 200.

Referring to FIG. 3, the injection signal generator 100 may generate 3-order, 5-order, 7-order, or 9-order harmonics, or the like, of the commercial frequency corresponding to the frequency of the grid as the injection signal, based on the grid phase information from the grid phase detector 50.

Referring to FIG. 1, the adder 200 adds the injection signal ST from the injection signal generator 100 to the predetermined fundamental wave command value I*inv to generate the final fundamental wave command value IF*inv and provide it to the main controller 300.

The main controller 300 performs the power control according to the final fundamental wave command value IF*inv from the adder 200.

Further, referring to FIGS. 1 and 2, the grid phase detector 50 included in the anti-islanding apparatus according to the present invention detects the grid phase corresponding to the phase of the voltage Vpcc at the point of common coupling (PCC) between the power conditioning system PCS 20 and the grid 32 and provides it to the multiplier 60.

The multiplier 60 multiplies the grid phase from the grid phase detector 50 by the predetermined direct current command value Ivdc to generate the fundamental wave command value I*inv.

In addition, the injection signal detector 400 according to the present invention detects the injection signal ST included in the voltage Vpcc at the point of common coupling (PCC) between the power conditioning system 20 and the grid 32 and provides it to the main controller 300.

In this case, the main controller (S) 300 stops the operation of the power conditioning system 20 when the level of the injection signal ST detected during the process of controlling the above-mentioned power is the predetermined reference level or more.

As shown in FIG. 2, referring to the equivalent circuit diagram of the grid impedance and the load impedance of the output end of the power conditioning system according to the present invention, when the point in which the PCS 20 intersects with the grid 32 is the point of common coupling (PCC), the parallel impedance of the grid impedance Zgrid and the load impedance Zload is shown if the grid 32 is interconnected with the PCS 20 when viewing the PCC from the PCS 20. In this configuration, the Zgrid is remarkably smaller than Zload, the parallel impedance value is shown as an extremely small value since it is several m [ohm] to sever [ohm].

For example, this may be described by being divided into the following 3 cases according to the level of the Zload and Zgrid.

Case 1: when Zload>Zgrid, Zpcc has a value smaller than Zgrid. During islanding, Zpcc is the same as Zload, such that impedance is increased. When the change in the impedance is sensed, the PCS output is interrupted.

Case 2: when Zload<Zgrid, Zpcc has a value smaller than Zload. During islanding, Zpcc is the same as Zload, such that impedance is increased. When the change in the impedance is sensed, the PCS output is interrupted.

Case 3: when Zload=Zgrid, Zpcc has a ½*Zload value. During islanding, Zpcc is the same as Zload, such that impedance is increased. When the change in the impedance is sensed, the PCS output is interrupted.

Further, since the grid voltage Vg is connected with the PCS 20, the extremely small 9-order harmonic component is shown in the voltage at the PCC even when the 9-order harmonic component is included in the output current Iinv of the PCS 20.

Unlike this, the grid 32 is interrupted, the grid voltage Vg and the grid impedance Zgrid are removed and the impedance of the PCC is determined by only the Zload. The grid voltage Vg is interrupted and is determined by the relatively larger load impedance Zload than the grid impedance Zgrid, such that the impedance of the PCC is sharply increased abruptly.

In this case, the 9-order harmonic component included in the output current Iinv of the PCS 20 is shown in the output voltage Vpcc of the PCS 20 according to the magnitude in the impedance at the PCC. The injection signal detector 400 detects a portion in which the 9-order harmonic component is sharply increased to allow the main controller 300 to determine the presence of an islanding state or not, according to the level of the 9-order harmonic component, such that the main controller 300 performs anti-islanding by interrupting the output of the PCS 20 and separating the PCS 20 from the grid 32.

As shown in FIG. 4, when the injection signal detector 400 is implemented as the Goertzel filter, it may detect the level of the injection signal ST included in the connection point voltage Vpcc.

In addition, the Goertzel filter shown in FIG. 4 is a type of a digital filter and receives a signal x[t] of a discrete time to output a discrete frequency spectrum x[k]. Herein, k represents a discrete frequency point, which is obtained by calculating only k integer multiple of a fundamental wave frequency ko. The Goertzel algorithm applied to the present invention is based on the N-point DFT and may further reduce the calculation amount than the N-point DFT when detecting the level and phase of the frequency component.

$$H(z) = \frac{1 - e^{-j\frac{2\pi k}{N}}z^{-1}}{1 - 2\cos\left(\frac{2\pi k}{N}\right)z^{-1} + z^{-2}} \quad \text{Equation 1}$$

$$\frac{k}{N} = \frac{fint}{fs} \quad \text{Equation 2}$$

$$x[n] = v[n] - 2\cos\left(\frac{2\pi k}{N}\right)v[n-1] + v[n-2] \quad \text{Equation 3}$$

$$v[n] = x[n] + 2\cos\left(\frac{2\pi k}{N}\right)v[n-1] - v[n-2] \quad \text{Equation 4}$$

$$y[n] = v[n] - v[n-1]e^{-j\frac{2\pi k}{N}} \quad \text{Equation 5}$$

$$|y[n]|^2 = \quad \text{Equation 6}$$
$$v^2[N-1] + v^2[N-2] - v[N-1]Ev[N-2]E2\cos\left(\frac{2\pi k}{N}\right)$$

Equation 1 is a transfer function equation of the Goertzel algorithm, Equation 2 is an equation showing the relationship between N-point and k. In Equations 1 to 6, K represents a discrete frequency, N represents a sampling number for one period of the grid voltage, fint represents a frequency to be extracted, and fs represents a sampling frequency.

In addition, Equations 3, 4, and 5 are the Goertzel algorithm Equation and may be shown as a Goertzel block diagram. Herein, n represents a current sampled value, v[n−1] represent a v[n] value of a previous sampling, and v[n−2] represents a v[n] value when being sampled prior to prior to performing sampling twice.

Referring to the timing waveform of the Goertzel filter shown in FIG. 5, when the Goertzel filter samples N input signals x[n] for one period of the grid voltage Vg, calculates the feed back part (FBP) for each sampling, and calculates the feed forward part (FFP) after calculating N-th feed back part (FBP), the frequency amplitude to be extracted may be calculated.

Referring to FIGS. 6 and 7, one zero of two poles of the Goertzel filter is offset with the pole, such that only one pole is present. As a result, only the signal corresponding to the discrete frequency k corresponding to the pole passes through the Goertzel filter. The result may be obtained depending on the following Equation 6.

As described above, the injection signal detector 400 according to the present invention monitors the level of the 9-order harmonic 60 [Hz]*9=540 [Hz] component at the connection point voltage Vpcc, such that the main controller 300 of the present invention determines the islanding or not.

Hereinafter, a method for controlling power quality of a power generation system according to the present invention will be described with reference to FIGS. 1 and 8 to 11.

In FIGS. 1 and 7, the power conditioning system 20 to which the anti-islanding of the present invention is applied converts the direct current Vpv from the solar cell 10 into the voltage suitable for grid connection.

That is, the DC/DC converter 21 of the power conditioning system 20 boosts the direct voltage Vpv from the solar cell 10 to the predetermined voltage level and tracks the maximum power point from the solar cell 10. The DC/AC inverter 22 of the power conditioning system 20 converts direct voltage from the DC/DC converter 21 into alternative voltage to supply the inverter current Iinv to the grid 32.

The anti-islanding method according to the present invention applied to the power conditioning system will be described.

First, referring to FIGS. 1 and 8, the generating (S100) of the present invention generates the injection signal ST having the predetermined frequency.

Next, the adding (S200) of the present invention generates the final fundamental command value IF*inv by adding the injection signal ST from the generating (S100) to the predetermined fundamental wave command value I*inv to generate the final fundamental wave command value IF*inv.

Next, the controlling (S300) of the present invention performs the power control according to the final fundamental wave command value IF*inv from the adding (S200).

Thereafter, the detecting (S400) of the injection signal according to the present invention detects the injection signal ST included in the voltage Vpcc at the point of common coupling (PCC) between the power conditioning system (PCS) 20 and the grid 32.

Continuously, the determining (S500) of the present invention determines whether the level of the detected injection signal ST is a predetermined reference level or more.

Further, when further including the stopping (S600) of the present invention, the stopping (S600) may stop the operation of the power conditioning system (PCS) 20 when the level of the injection signal ST is the predetermined reference level or more.

Referring to FIG. 9, the method for the anti-islanding of the power conditioning system may further include generating the fundamental wave command value, wherein the generating of the fundamental wave command value may include the detecting of the grid phase (S50) and the multiplying (S60).

In this case, the detecting of the grid phase (S50) detects the grid phase corresponding to the phase of the voltage Vpcc at the point of common coupling (PCC) between the power conditioning system (PCS) and the grid 32 and provides it to the multiplying (S60).

The multiplying (S60) multiplies the grid phase from the detecting of the grid phase by the predetermined direct current command value I*vdc to generate the fundamental wave command value I*inv.

Referring to FIG. 10, the generating (S100) may generate the 9-order harmonic of the commercial frequency as the injection signal ST.

That is, the generating (S100) may generate 540 Hz that is the 9-order harmonic of the used frequency 60 Hz.

Referring to FIG. 11, the generating of the injection signal (S400) may be configured to include a transfer function H(z) having the feedback part and the feed forward part.

In more detail, the generating of the injection signal (S400) may includes the predetermined feed back part (FBP) step (S410), the predetermined feed forward part (FFP) step (S420), and calculating (S430) the level of the 9-order harmonic |Vpcc9th| of the load current IL.

The transfer function H(z) may be represented by the following Equation 1. The following Equation 2 represents the relationship between a discrete frequency k and a sampling frequency fs to be extracted and a frequency fint to be extracted. Equations 3, 4, and 5 represent the following Equation 1 as a difference equation.

In the following Equations 1 to 5, x[n] represents a currently input signal sample, v[n] represents an intermediate result from current calculation, v[n−1] represents a result from previous sampling, and v[n−2] represent a place storing a result from calculation prior to performing sampling twice. y[n] represents a result value of the Goertzel filter.

As described above, when the following Equations 3, 4, and 5 are represented as a block diagram, they may be shown as in FIG. 3.

Hereinafter, the existing power conditioning system and the power conditioning system to which the present invention is applied will be described.

Referring to the waveforms of the load voltage and the grid current shown in FIG. 12, the waveforms of the output voltage Vload and the grid current Ig of the inverter are shown as a simulation result. Since the distributed power from 0 second to 0.6 seconds performs power generation by the system, the system current is shown. All the power 3 kW generated from the distributed power supply by being connected to the resistive load of 3 kW at 0.6 seconds are consumed at the resistive load, such that current does not almost flow in the grid. The grid is completely opened from the distributed power supply at 0.9 seconds, such that the system current becomes 0.

Referring to FIG. 13, the spectrum shown in FIG. 13 shows a result of analyzing frequency components of the output voltage of the inverter while the grid is connected with the distributed power supply. It can be appreciated that only the fundamental wave 60 Hz is shown as the magnitude in 311 [V].

The present invention will be described, as compared to the above-mentioned existing power conditioning system.

FIG. 14 is a spectrum diagram when the system of the present invention is opened. The spectrum shown in FIG. 14 is a waveform showing the frequency components of the output voltage of the inverter after the grid is opened. It can be appreciated that the 9-order harmonic voltage component according to the 9-order harmonic current injection is shown after the grid is opened.

FIG. 15 is a waveform showing a PCS output voltage and an extracted 9-order harmonic level component. The waveform shown in FIG. 15 shows the inverter output voltage and the 9-order harmonic level extracted from the Goertzel algorithm.

That is, when the grid is opened at 0.9 seconds, it can be appreciated that the 9-order harmonic component extracted by the Goertzel algorithm is shown as 1.8[V] after one period of the inverter output voltage fundamental wave. After it is confirmed that the 9-order harmonic component is detected, the anti-islanding function is performed.

The present invention as described above uses the proposed method to obtain the following improved effects, as compared to the existing system. Since only the 9-order harmonic of the reference value or less is injected into the grid, the quality of the grid power is not degraded. The present invention uses the scheme of extracting the 9-order harmonic components, such the non detection zone (NDZ) is not present. After the grid is interrupted, the present invention can successfully perform the anti-islanding function even though other distributed power supplies connected with in parallel continuously supply power. The present invention is easy to apply to the 3-phase PCS. The present invention may be used by being mixed with other anti-islanding methods.

As set forth above, the present invention can easily detect the islanding state by using an injection signal maintained at a level smaller than that of a reference level in a grid interconnected state and increased to a level greater than a reference level in an islanding state.

While the present invention has been shown and described in connection with the exemplary embodiments, it will be apparent to those skilled in the art that modifications and variations can be made without departing from the spirit and scope of the invention as defined by the appended claims.

What is claimed is:

1. An apparatus for the anti-islanding of a power conditioning system including a DC/DC converter and a DC/AC inverter in order to transfer power from a solar cell array to a grid, comprising:
    an injection signal generator generating an injection signal having a predetermined frequency;
    an adder generating a final fundamental wave command value by adding the injection signal from the injection signal generator to a predetermined fundamental wave command value;
    a main controller performing the power control according to the final fundamental wave command value from the adder and stopping the operation of the power conditioning system when the level of the detected injection signal has reached a predetermined reference level or more; and
    an injection signal detector detecting the injection signal included in voltage at a point of common coupling between the power conditioning system and the grid and providing them to the main controller.

2. The apparatus for the anti-islanding of a power conditioning system of claim 1, wherein the injection signal generator generates harmonics of a commercial frequency as the injection signal.

3. The apparatus for the anti-islanding of a power conditioning system of claim 1, wherein the injection signal generator generates a 9-order harmonic of the commercial frequency as the injection signal.

4. The apparatus for the anti-islanding of a power conditioning system of claim 3, further comprising:
    a grid phase detector detecting a grid phase corresponding to a phase of the voltage at the point of common coupling between the power conditioning system and the grid; and a multiplier multiplying the grid phase from the grid phase detector by a predetermined direct current command value to generate the fundamental wave command value.

5. A method for the anti-islanding of a power conditioning system including a DC/DC converter and a DC/AC inverter in order to transfer power from the solar cell array to the grid, comprising:
   generating an injection signal having a predetermined frequency;
   adding the injection signal from the generating to a predetermined fundamental wave command value to generate a final fundamental wave command value;
   controlling to perform the power control according to the final fundamental wave command value from the adding;
   detecting the injection signal included in the voltage at the point of common coupling between the power conditioning system and the grid;
   determining whether the level of the detected injection signal has reached a predetermined reference level or more; and
   stopping the operation of the power conditioning system when the level of the injection signal has reached the predetermined reference level or more.

6. The method for the anti-islanding of a power conditioning system of claim 5, further comprising generating a fundamental wave command value,
   wherein the generating of the fundamental wave command value includes detecting a grid phase corresponding to a phase of the voltage at the point of common coupling between the power conditioning system and the grid and multiplying the grid phase from the detecting of the grid phase by a predetermined direct current command value to generate the fundamental wave command value.

7. The method for the anti-islanding of a power conditioning system of claim 6, wherein the generating generates harmonics of a commercial frequency as the injection signal.

8. The method for the anti-islanding of a power conditioning system of claim 6, wherein the generating generates a 9-order harmonic of the commercial frequency as the injection signal.

9. The method for the anti-islanding of a power conditioning system of claim 8, further comprising:
   detecting a grid phase corresponding to a phase of the voltage at the point of common coupling between the power conditioning system and the grid; and
   multiplying the grid phase from the detecting the grid phase by the predetermined direct current command value to generate the fundamental wave command value.

* * * * *